United States Patent
Kvaal et al.

(10) Patent No.: US 9,641,585 B2
(45) Date of Patent: May 2, 2017

(54) AUTOMATED VIDEO EDITING BASED ON ACTIVITY IN VIDEO CONFERENCE

(71) Applicant: CISCO TECHNOLOGY, INC., San Jose, CA (US)

(72) Inventors: Ingrid Kvaal, Oslo (NO); Vigleik Norheim, Oslo (NO); Kristian Tangeland, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/733,485

(22) Filed: Jun. 8, 2015

(65) Prior Publication Data

US 2016/0359941 A1    Dec. 8, 2016

(51) Int. Cl.
*H04N 7/15* (2006.01)
*H04L 29/06* (2006.01)
*H04N 7/14* (2006.01)
*G11B 27/031* (2006.01)

(52) U.S. Cl.
CPC .......... *H04L 65/605* (2013.01); *G11B 27/031* (2013.01); *H04N 7/147* (2013.01); *H04N 7/15* (2013.01)

(58) Field of Classification Search
CPC combination set(s) only.
See application file for complete search history.

(56) References Cited

U.S. PATENT DOCUMENTS

| | | | |
|---|---|---|---|
| 8,300,556 B2 * | 10/2012 | Kalipatnapu | H04L 12/1822 370/260 |
| 2008/0126226 A1 * | 5/2008 | Popkiewicz | G06Q 30/02 705/26.1 |
| 2008/0218586 A1 * | 9/2008 | Graham | H04L 12/1822 348/14.09 |
| 2012/0033947 A1 * | 2/2012 | Benbrahim | H04N 5/77 386/252 |
| 2012/0051719 A1 * | 3/2012 | Marvit | G11B 27/034 386/285 |
| 2013/0063544 A1 * | 3/2013 | Kanniappan | G06Q 10/10 348/14.07 |
| 2013/0300939 A1 | 11/2013 | Chou et al. | |
| 2014/0184731 A1 | 7/2014 | Bebbington et al. | |
| 2015/0049247 A1 | 2/2015 | Kajarekar et al. | |
| 2015/0085061 A1 | 3/2015 | Sun et al. | |
| 2015/0201161 A1 * | 7/2015 | Lachapelle | H04N 7/15 348/14.07 |

OTHER PUBLICATIONS

"Speaker Diarization: A Review of Recent Research", X. A. Miro et al., IEEE Transaction on Audio, Speech, and Language Processing, vol. 20, No. 2, Feb. 2012.
"Defining Virtual Reality: Dimensions Determining Telepresence", J. Steuer et al., SRCT Paper #104, Oct. 15, 1993.
http://www.broadcastpix.com/VOX.html, Apr. 27, 2015.

* cited by examiner

*Primary Examiner* — Joseph J Nguyen
(74) *Attorney, Agent, or Firm* — Cindy Kaplan

(57) ABSTRACT

In one embodiment, a method includes receiving at a network device, video and activity data for a video conference, automatically processing the video at the network device based on the activity data, and transmitting edited video from the network device. Processing comprises identifying active locations in the video and editing the video to display each of the active locations before a start of activity at the location and switch between the active locations. An apparatus and logic are also disclosed herein.

20 Claims, 5 Drawing Sheets

US 9,641,585 B2

AUTOMATED VIDEO EDITING BASED ON ACTIVITY IN VIDEO CONFERENCE

TECHNICAL FIELD

The present disclosure relates generally to video conferencing, and more particularly, to automated video production for a video conference.

BACKGROUND

Video conferencing provides real-time, face-to-face interactions between people from distributed geographic locations and has become increasingly popular as a way to reduce travel expenses and enhance collaboration. A video conference system includes an endpoint that captures video of participants in a room during a conference and then transmits the video to a conference server or another endpoint. Video conference systems may be configured to display activity such as an active speaker, however, since the system typically reacts to changes in the video conference, a new speaker may not be shown until the person has been speaking for a period of time.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
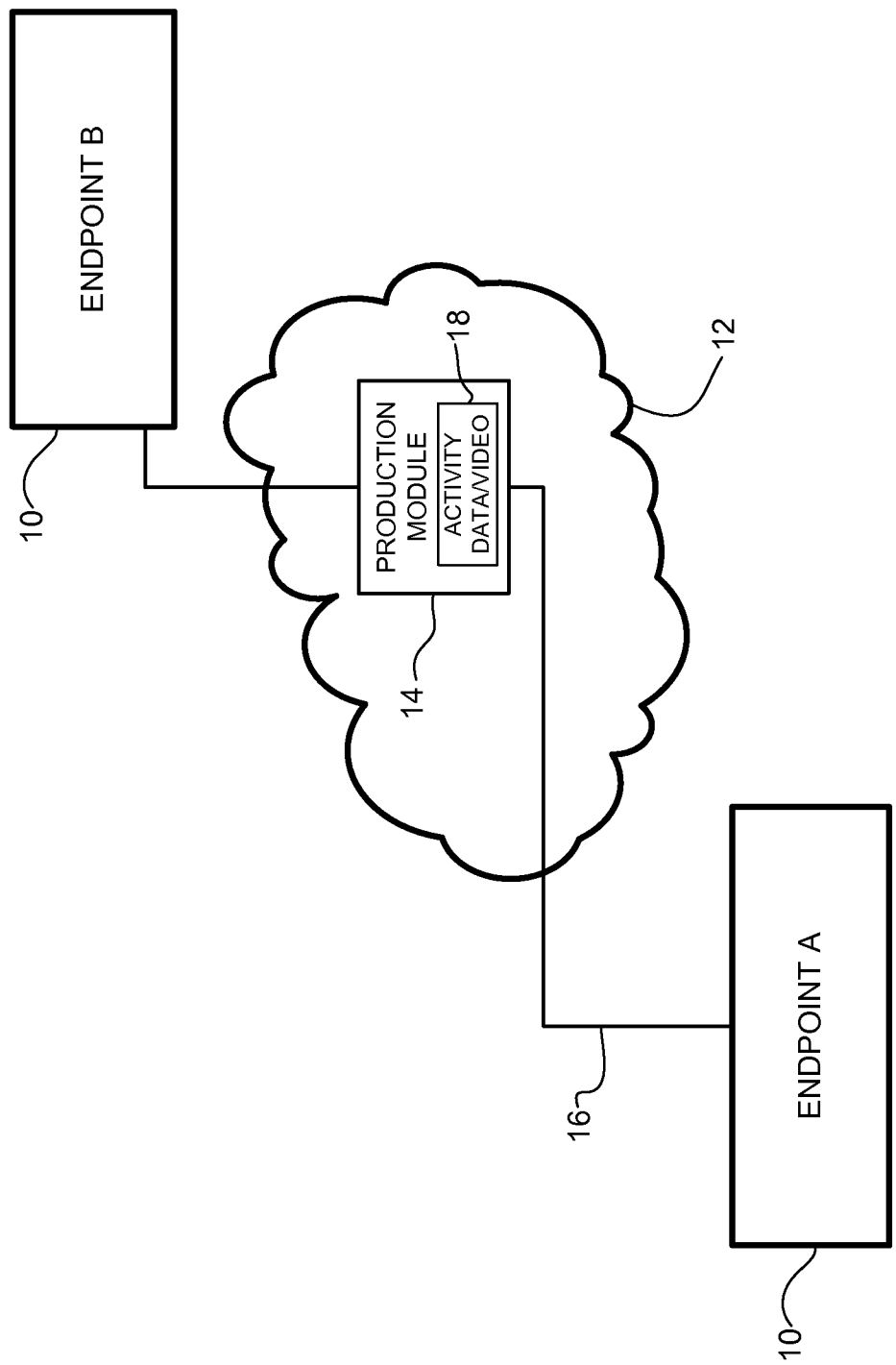
FIG. 1 illustrates an example of a network in which embodiments described herein may be implemented.

In one embodiment, a method generally comprises receiving at a network device, video and activity data for a video conference, automatically processing the video at the network device based on the activity data, and transmitting edited video from the network device. Processing comprises identifying active locations in the video and editing the video to display each of the active locations before a start of activity at the location and switch between the active locations.

In another embodiment, an apparatus generally comprises an interface for receiving video and activity data for a video conference, a processor for automatically processing the video based on the activity data, wherein processing comprises using the activity data to identify active locations in the video and editing the video to display each of the active locations before a start of activity at the location and switch between the active locations, and transmitting the edited video. The apparatus further comprises memory for storing the video and activity data.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In a conversation in which all participants are physically present, people typically look to a person (or people) that are speaking, a person that is expected to speak soon, or to people whose reactions they would like to observe. An inherent problem with conventional speaker tracking and voice-switched video conferencing systems is that they are reactive rather than proactive. Thus, a new speaker is not shown in the video until the person has been speaking for a given time. This prevents participants from experiencing the initial facial reaction of the speaker and in some cases, not immediately knowing who is speaking. It may also be difficult to display the active speakers in a rapid crossfire discussion between multiple speakers, in which case the video may switch back and forth multiple times and may not even capture the person currently speaking.

The embodiments described herein provide for automated video production based on data such as event logs created from a video conference. One or more embodiments may use, for example, audio events, speaker tracking, or other data to automatically edit raw video images from a video conference. The edited video allows for easier and more efficient viewing of the video conference. For example, a viewer of the video will immediately be able to identify the speaker and also see the speaker's initial facial reaction. No manual editing or expertise is needed to obtain good production value in video recordings of conferences. The edited video may be viewed as a near-live broadcast in applications in which a small delay in the live video stream is acceptable or stored for later viewing, as described below.

The term 'conference' or 'video conference' as used herein may refer to a meeting, telepresence session, teleconference, broadcast, telecast, show, seminar, class, presentation, panel discussion, question/answer session, or any other communication session between a plurality of participants transmitted using any video means. The conference may be, for example, for business, personal, education, entertainment, or any other purpose.

Referring now to the drawings, and first to FIG. 1, an example of a network in which embodiments described herein may be implemented is shown. For simplification, only a limited number of nodes are shown. The network includes a communication system comprising endpoints A and B (e.g., media sources/receivers) 10 in communication over network 12. The network 12 may include one or more networks (e.g., local area network, metropolitan area network, wide area network, enterprise network, Internet, intranet, radio access network, public switched network, or any other network). The endpoints 10 are connected via any number of communication links 16. Media flow paths between the endpoints 10 may include any number or type of intermediate nodes (e.g., routers, switches, gateways, or other network devices), which facilitate passage of data between the endpoints.

The endpoints 10 are configured to originate or terminate communications over the network 12. The endpoints 10 may be any device or combination of devices configured for receiving, transmitting, or receiving and transmitting media flows. For example, the endpoint 10 may be a media center device (e.g., TelePresence device), mobile device (e.g., phone, personal digital assistant, tablet), personal computer, laptop, or any other device capable of engaging in video exchanges within the network 12. The endpoints 10 may be wired or wireless communication devices. There may be one or more participants located at or associated with each endpoint 10.

The communication system further includes a production module 14 configured to process video transmitted between endpoints 10 based on event logs or other data. For example, event logs may be created or generated from various activities, saved along with raw video material from the conference, and used to automatically improve editing of the session. The production module 14 may be operable to edit the raw video image data to switch between different views or reformat a view, for example. The production module 14 may include, for example, an audio detector to detect active audio sources and classify the detected audio as speech based on sensed or transduced audio, a face detector to detect faces in the video, a motion detector to detect motion in the video, an object tracker to track objects in the video, or any combination of these or other components. As described in detail below, the production module 14 may use the activity data to identify active locations (e.g., locations of active speakers) to include the relevant video in the edited video.

The production module 14 may further comprise memory 18 for storing video and activity data (e.g., audio data, event logs, video data, raw video from conference, edited video). The edited version of the recorded conference may be displayed in near-real time or stored for later access by a conference participant or others interested in viewing the conference. For example, a small delay may be introduced in a live video stream of the conference so that the video stream can be edited using the activity data to provide proactive switching of the video based on the activity data and a near-live broadcast can be output during the live video conference. The edited video may also be made available to conference participants or others interested in viewing a portion or all of the video conference. The edited video may be encrypted, compressed, or encoded according to any format.

The embodiments described herein may be implemented at a central production module 14 located within the network 12 (e.g., in a communication path between endpoints 10 as shown in FIG. 1) or at a production module located at one or more endpoints 10, or any combination thereof. The production module 14 may be installed, for example, at a media experience engine, multimedia transformation unit, multipoint conferencing unit, server, or any other node configured to receive, process, and transmit video. Components of the production module 14 may also be located at one or more nodes so that one or more processes can be performed at one endpoint 10 and one or more processes performed at another endpoint or at the central production module. For example, one or more processes may be performed as the raw video and activity data are received to reduce the amount of storage needed or the video may be edited after the raw video images and activity data are stored.

It is to be understood that the network shown in FIG. 1 and described herein is only an example and that the embodiments may be implemented in networks having different network topologies or network devices, without departing from the scope of the embodiments. For example, the network may include any number or type of network devices that facilitate passage of data over the network (e.g., routers, switches, gateways), network elements that operate as endpoints or hosts (e.g., servers, clients), and any number of network sites in communication with any number of networks.

Figure 2:
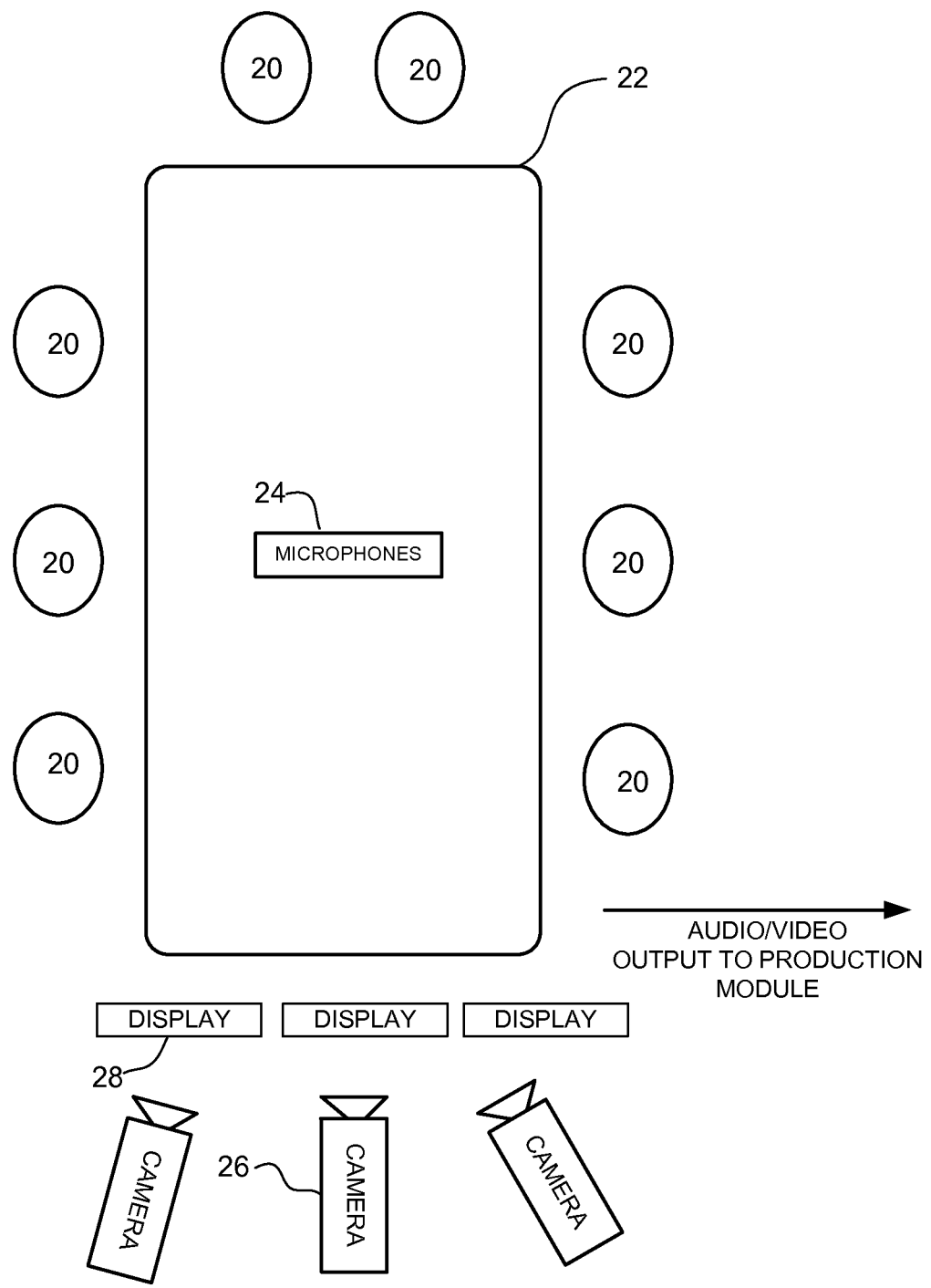
FIG. 2 is a top view of an example of a conference room operating as one of the endpoints in the network of FIG. 1.

FIG. 2 is a schematic top view illustrating an example of a conference room arrangement for use in a teleconference. Participants 20 may be seated around a table 22 or may be standing or walking around the room. The room may include one or more microphones (e.g., microphone array) 24 positioned on the table 22 or near the participants 20. The microphones 24 may also be placed close to cameras 26 or on the walls or roof, or any combination thereof. One or more image capturing devices (e.g., cameras) 26 are located in the conference room and preferably positioned to view most of the room. The room also includes one or more display screens 28. The display screens 28 may be located, for example, below the cameras 26.

The microphone 24 comprises any number of microphones or microphone arrays depending on the size and acoustics of a room or area in which the endpoint is deployed. As described in detail below, when one of the participants 20 speaks, the microphone 24 may be used to capture the distance and angular direction of the user that is speaking. This information may be used to identify the active location in the video conference so that the current speaker is displayed in the edited video.

It is to be understood that the arrangement shown in FIG. 2 is only an example and other arrangements may be used without departing from the scope of the embodiments. For example, high end teleconference (sometimes referred to as TelePresence) rooms may include any number of microphones 24, cameras 26, and display screens 28. An endpoint may also be, for example, a mobile device comprising a camera and microphone for communication with one or more other endpoints. Thus, the camera 26 may comprise a video camera in a cell phone, desktop computer, laptop, tablet, or any other suitable image capturing device. Also, the system described herein may be used at locations other than conference rooms, including for example, classrooms, studios, homes, outdoor facilities, or any other environment.

Figure 3:
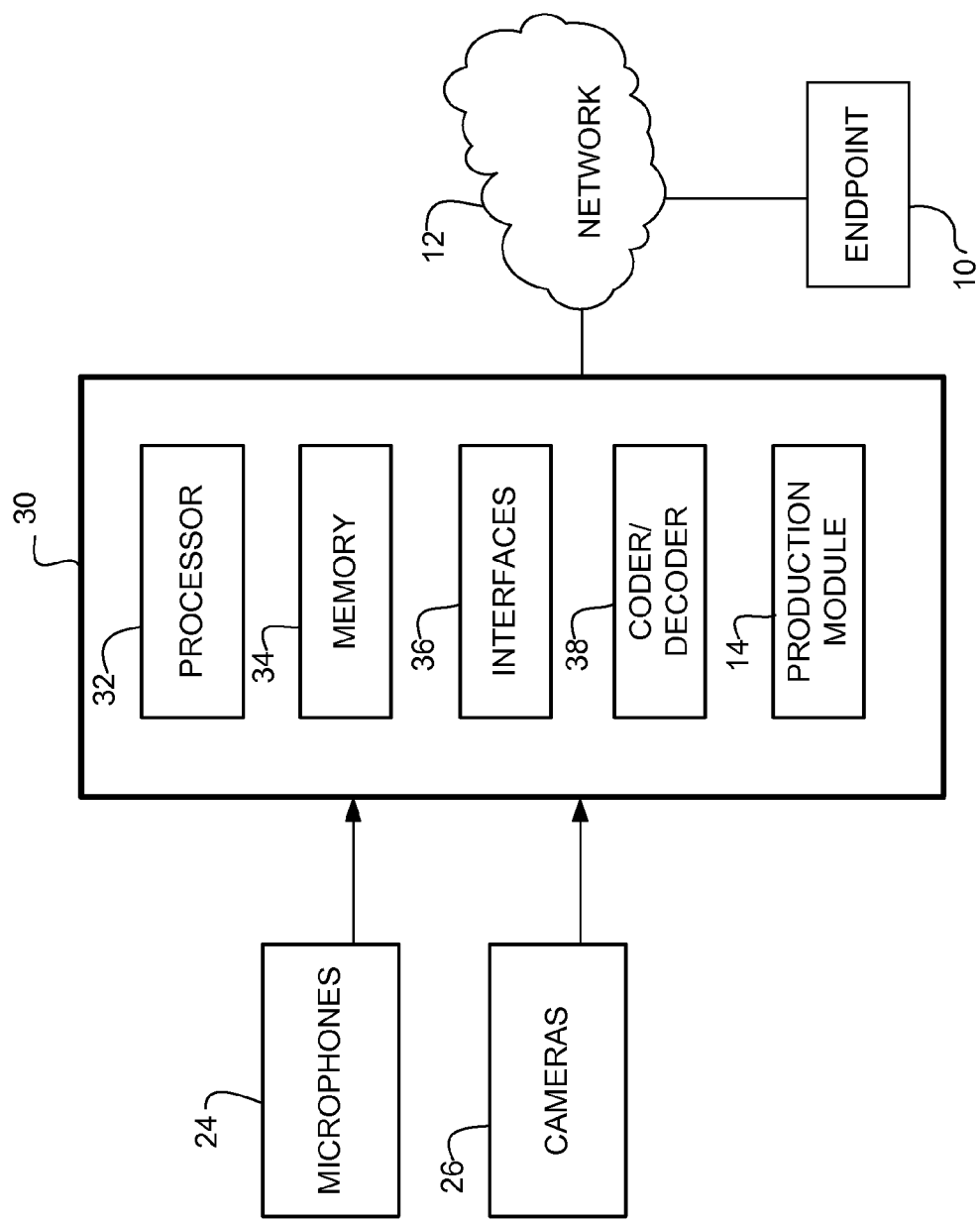
FIG. 3 depicts an example of a network device useful in implementing embodiments described herein.

FIG. 3 is a block diagram illustrating an example of a network device 30 that may be used to implement embodiments described herein. The network device 30 is in communication with one or more endpoints 10 over network 12, as described above with respect to FIG. 1. The network device 30 receives input from any number of microphones 24 and video cameras 26 at one or more endpoints. The network device 30 is a programmable machine that may be implemented in hardware, software, or any combination thereof. In the example shown in FIG. 3, the network device 30 includes a processor 32, memory 34, interfaces 36, coder/decoder subsystem 38, and production module 14.

Logic may be encoded in one or more tangible computer readable media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32.

Memory 34 may be a volatile memory or non-volatile storage, which stores various applications, modules, and data for execution and use by the processor 32. Production module 14 (e.g., code, logic, software) and audio/video data (e.g., activity data, raw video, edited video) may also be stored at memory 34. Memory 34 may further store data used and generated by image and audio detectors, including, for example, face/motion information, information associated with detected motion, audio source information associated with detected active audio sources, and location information.

The interfaces 36 may comprise any number of interfaces (linecards, ports) for receiving signals or data or transmitting signals or data to other devices. The interface 36 may include, for example, an Ethernet interface for connection to a computer or network. The network interfaces 36 may be configured to transmit or receive data using a variety of different communication protocols. The interfaces 36 may include mechanical, electrical, and signaling circuitry for communicating data over physical links coupled to the network.

The coder/decoder subsystem 38 may include, for example, an audio codec and video codec configured to accept audio and video signals and compress the audio and video for transmission to the other endpoints 10 of the teleconference or a storage system.

It is to be understood that the network device 30 shown in FIG. 3 and described above is only an example and that different configurations of network devices may be used. The network device 30 may further include any suitable combination of hardware, software, algorithms, processors, DSPs (digital signal processors), devices, components, or elements operable to facilitate the capabilities described herein. For example, the network device may further include a face detector, motion detector, audio detector, object tracker, or other module or logic operable for use in collecting or processing activity data. The network device 30 may include additional subsystems of a teleconference system located at the endpoint 10 or may be a standalone device within a communication path between endpoints 10.

Figure 4:
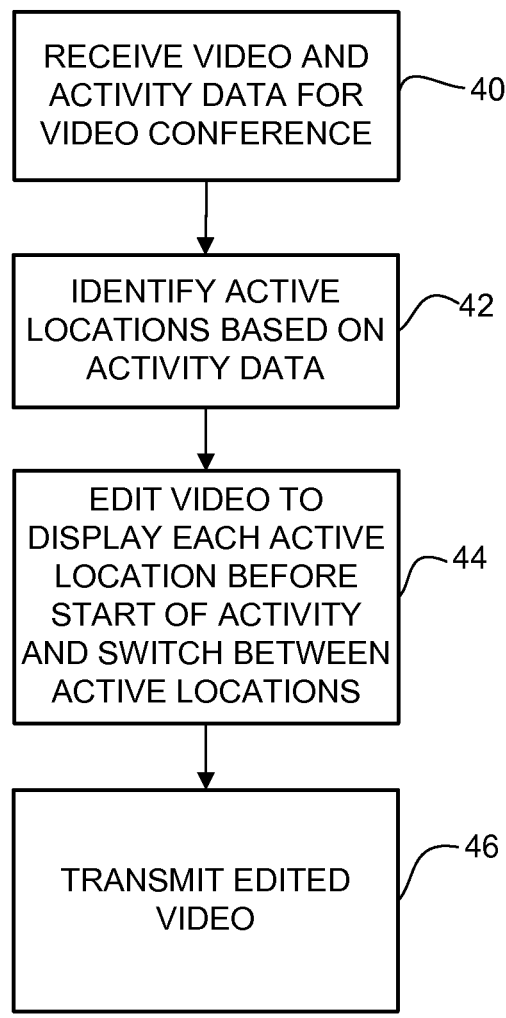
FIG. 4 is a flowchart illustrating an overview of a process for automated video production, in accordance with one embodiment.

FIG. 4 is a flowchart illustrating an overview of a process for automated video conference production, in accordance with one embodiment. At step 40, a network device (e.g., production module 14 in FIG. 1) receives video (e.g., raw video input streams) and corresponding activity data (e.g., audio events, speaker tracking data, event logs, metadata, or other data) from a video conference. The raw video preferably contains video of an entire room (or at least a portion of the room containing active participants) that allows for cropping to a close up of one or more of the participants. If there are multiple endpoints, the raw video preferably contains separate video recordings from each site.

The production module 14 automatically processes the video based on the activity data. The processing may comprise, for example, identifying one or more active locations in the video conference (step 42) and editing the video to display each of the active locations before the start of activity at the location (step 44). The active location may be, for example, a location in a conference room at which a participant 20 is speaking or performing an action (FIG. 2). The location may be identified by a coordinate (e.g., (x, y)/(x, y, z) or relative distance and angle from a reference location (e.g., microphone 24)) or by a participant 20 (e.g., identifiable by speech or face recognition) associated with a location in the conference room, for example.

The production module 14 may use the activity data to edit the video to show active locations in the video conference at the start of activity or before the activity starts. For example, the raw video images may be edited to generate a video displaying a first speaker before the speaker begins to talk. The video may be edited to switch to a second location before the start of activity at the second location, as indicated by the activity data. Editing of the video may comprise, for example, switching layouts, reformatting, reframing, cropping, zooming in or out, combining/stitching, or any other process performed on raw video images received from a plurality of image capturing devices at one or more endpoints.

The edited video is transmitted for output on a display screen (step 46). For example, the edited video may be transmitted to other endpoints in the video conference providing near real-time video (e.g., five second or any other time period delay sufficient to allow for automated editing). The edited video may also be transmitted to a participant of the video conference or other person interested in viewing the recorded video after the conference has ended, or sometime after the video conference has started but before it has ended. The video may be optimized based on the device on which the video is to be viewed, for example.

It is to be understood that the process shown in FIG. 4 and described above is only an example and that steps may be modified, added, or combined, without departing from the scope of the embodiments.

As previously described, the activity data may be used to identify an active location in a plurality of raw input video streams. The active location may include, for example, a location in a room at which a participant is talking, raising his hand, holding up an object to display, writing on a white board, or any other action initiated within the conference and identified by the activity data. As described further below, the activity data may comprise audio data, video data, event logs, speaker tracking data, motion detection data, face detection data, speech recognition data, metadata, or any other type or combination of data that may be used to indicate a change in activity within the video conference. Once an activity or change in activity is indicated, the corresponding video or video frames can be identified and displayed at the beginning of the activity or immediately before the activity has started (e.g., one second, five seconds, ten seconds, or any other time period before the start of the activity). In one example, the video is edited to zoom in on a participant before the participant begins to speak. As noted above, this is beneficial in that initial facial reactions are captured and a viewer of the video will immediately know who is speaking.

Figure 5A:
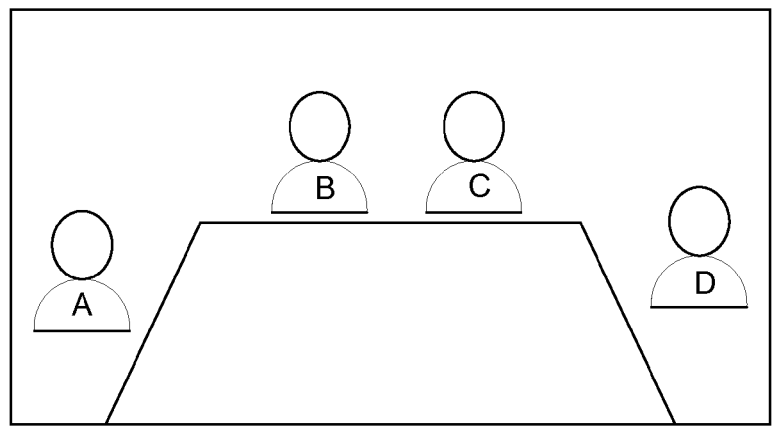
FIG. 5A illustrates a view of a video conference endpoint at the start or end of a video conference.

As described above with respect to the process shown in FIG. 4, activity data is used in the automatic editing process to determine when to switch, reframe, or change the video layout. In one example, the edited video may initially display all participants (A, B, C, D) in a conference room (FIG. 5A) or multiple conference rooms. An overview of all participants may be displayed until everyone is present. For example, in the first few minutes of a meeting when people are joining the conference, the video may show the entire room and remain in an overview layout until everyone is present, as shown in FIG. 5A. Multiple overview layouts may be displayed on one or more display screens for multiple endpoints.

Figure 5B:
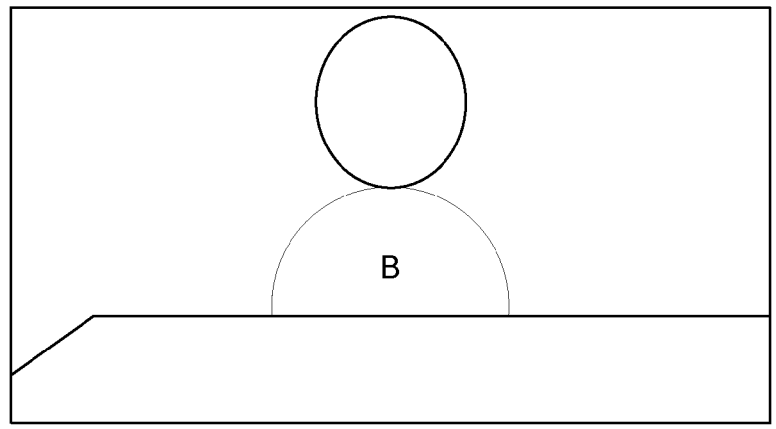
FIG. 5B illustrates a view of an active speaker at the video conference endpoint shown in FIG. 5A.

In one example, when the activity data identifies an active speaker, the video may be edited to zoom in on the active speaker (e.g., video stream cropped to show active speaker) as shown in FIG. 5B. Since the activity data identifies when the first speaker begins to talk, the video can be edited to display the first active speaker before he starts to talk.

Figure 5C:
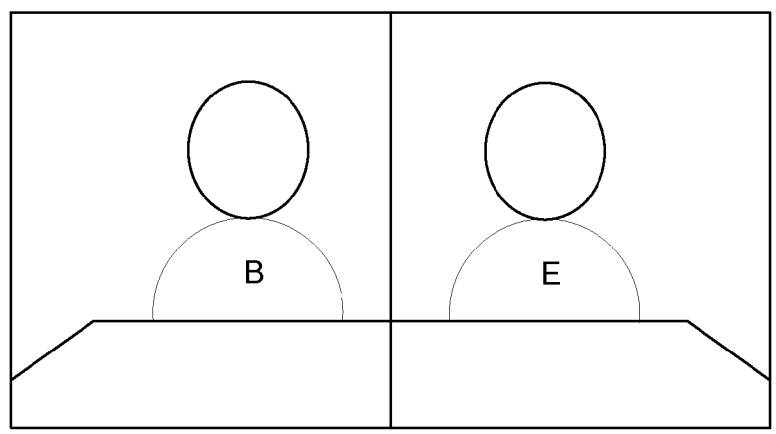
FIG. 5C illustrates a view of two active speakers at different endpoints.

If there is more than one active speaker (e.g., discussion with rapid changes in speaker), two or more active speakers may be shown at one time, as shown in FIG. 5C, to avoid displaying rapid switching back and forth between active speakers. This may also be used when participants take turns speaking, but speak in rapid succession, to avoid changing the image too rapidly. For example, if more than one change in speaker occurs in less than a predetermined time period (e.g., ten seconds), multiple images may be displayed since changing the image too often could be disruptive to viewers. If both speakers are in close proximity in the same room, a local view of the area in the room with both speakers visible is preferred to jumping between both speakers. In another example, the speakers are at different sites and a layout in which both speakers are given equal importance is used (e.g., speakers B and E in FIG. 5C).

In one embodiment, the video is edited to show "relief shots" if one speaker is talking for a long time. For example, during long monologues, the video may be edited to switch the image from the active speaker to participants other than the active speaker for a short period of time, and then switch back to show the active speaker. This may be useful to provide better contextual awareness and avoid boredom.

At the end of the conference, the video image may switch back to an overview of all participants. For example, during the last portion (e.g., last few seconds) of the conference, when people are saying goodbye and logging off, the video may show a view of who was there, rather than continuing to focus on the last person to speak. As shown in FIG. 5A, the video may be edited to zoom out to show all participants in a conference room. For a conference with multiple endpoints, the video may switch to a layout that shows everyone equally.

It is to be understood that the simplified views shown in FIGS. 5A, 5B, and 5C are only examples, and that many other layouts and formats may be used without departing from the scope of the embodiments. For example, if the video is to be viewed at an endpoint with multiple display screens, the video may be edited to show different views on different display screens.

As previously described, the activity data may comprise various types of audio, video, or event data. The following describes examples of data that may be captured and used in the editing process. It is to be understood that these are only examples and that other methods or data may be used to identify an active location in the raw video image, without departing from the scope of the embodiments.

In one embodiment, the activity data comprises audio data that indicates a location of a source of audio picked up by the microphone array 24 (FIG. 2). For example, audio directional localization sensors may be used to identify an audio source. The audio source may be, for example, a person that is speaking (current, active speaker). Event logs may be created from audio events and saved alongside raw video material from the video conference. Audio data sourced by a relevant target (e.g., active speaker) may be obtained for use in editing the video images received from the endpoints so that the optical focus setting displayed focuses on the relevant target. The video image may be edited to include the audio source (e.g., person that is the source of the audio picked up by the microphone array 24) in a field of view (or image frame) of the video.

Audio signal processing may be performed on the sensed audio, particularly from different spaced apart pairs of microphones in the microphone array 24, to estimate a position of the audio source. A location in a room layout may be determined based on the distance and angular direction of the speaker as indicated by the microphone array. For example, a sound angle of arrival may be derived based on a time difference between time-of-arrivals of sound received by the individual microphones. Distance between the microphone array and audio source may be derived based on a combination of multiple time differences derived from the sensed audio from different microphone pairs. In another example, the angle and range of incoming audio can be calculated by finding a sample delay between microphone pairs. It is to be understood that these are only examples and other techniques may be used to identify a location of the audio source.

A location of the speaker may also be identified using image processing and object (e.g., face) recognition algorithms, for example. Background subtraction may be used to isolate foreground objects. Face detection may include reporting the position of a person as an x, y coordinate, for example. Face detection may include eye detection or fitting elliptical shapes to edges detected corresponding to a face, though other face detection algorithms known by those skilled in the art are contemplated to be within the scope of the embodiments. Other people tracking techniques that may be used include motion tracking or stereo (depth) cameras that use infrared light, for example. Facial detection processing need not necessarily detect a full frontal facial image. For example, silhouettes, partial faces, upper bodies, and gaits are detectable with detection processing. Face detection may be used, for example, to confirm that picked up audio corresponds to a speaker and not a reflection of the voice. Detection of a face at the location confirms the existence of a speaker and increases the accuracy.

In one embodiment, the production module 14 is operable to process video captured with camera 26 to detect and track participant faces and associated positions and audio sensed by the microphone to detect active audio sources (e.g., active speakers among the participants 20) and associated positions thereof (FIG. 2). Based on comparisons between the detected/tracked participant faces and active speakers, the production module 14 may generate an edited video showing the active speaker and switch between different views in which a current speaker is shown in the captured video. The system may, for example, associate the person (visually detected face or face and body) with a voice (audio detected sound source). If the person changes his location within the room, information received from the camera 26 may be used to identify the location of the sound source. The audio is processed to generate audio data and direction information indicative of the direction of sound received at the microphones 24. The location of a person 20 may be mapped relative to the microphones 24 and the approximate distance and angle from the microphones used to identify sound received from the person.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a network device, video and activity data for a video conference, the network device positioned within a communication path between endpoints of the video conference;
   automatically processing the video at the network device receiving the video and activity data based on the activity data, wherein processing comprises identifying active locations in the video and editing the video to display each of said active locations before a start of activity at said location and switch between said active locations before a start of activity; and
   transmitting the edited video from the network device as a near real-time video with a small delay to account for automated editing of the video;
   wherein the video comprises raw video from one or more endpoints and contains said active locations and wherein the edited video displays said active locations before a start of said activity at said active locations and includes a speaker's initial facial reaction before speaking.

2. The method of claim 1 wherein the activity data comprises event logs generated in the video conference.

3. The method of claim 1 wherein processing the video comprises identifying a first location in the video and editing the video to display said first location before a start of activity at said first location and switching the video to display a second location before a start of activity at said second location, wherein each of said locations comprise an active speaker.

4. The method of claim 1 wherein identifying said active locations comprises identifying locations of active speakers in the video.

5. The method of claim 4 wherein the activity data comprises audio data associated with the active speakers.

6. The method of claim 4 wherein the video is edited to simultaneously display at least two active speakers when a change in speaker occurs in less than a predetermined time.

7. The method of claim 4 wherein the active speaker is talking more than a predetermined time and further comprising editing the video to temporarily display an image other than the active speaker.

8. The method of claim 1 wherein receiving video comprises receiving raw video images from a plurality of image capturing devices at an endpoint.

9. The method of claim 1 wherein receiving video comprises receiving raw video images from a plurality of endpoints participating in the video conference.

10. The method of claim 1 wherein the activity data comprises speaker tracking data.

11. The method of claim 1 wherein transmitting the edited video comprises transmitting the edited video to an endpoint in the video conference with a delay in a live broadcast.

12. The method of claim 1 wherein transmitting the edited video comprises transmitting the edited video after the video conference has ended.

13. The method of claim 1 wherein the video comprises multiple input streams of the video conference covering all participants at all endpoints for the duration of the video conference.

14. The method of claim 13 further comprising editing the video to display all participants for a specified period of time at a start and end of the video conference.

15. An apparatus comprising:
    an interface for receiving video and activity data for a video conference;
    a processor for automatically processing the video based on the activity data, wherein processing comprises using the activity data to identify active locations in the video and editing the video to display each of said active locations before a start of activity at said location and switch between said active locations before a start of activity, and transmitting the edited video as a near real-time video with a small delay to account for said automated editing of the video; and
    memory for storing the video and the activity data;
    wherein the video comprises raw video from one or more endpoints and contains said active locations and wherein the edited video displays said active locations before a start of said activity at said active locations and includes a speaker's initial facial reaction before speaking.

16. The apparatus of claim 15 wherein the activity data comprises event logs generated in the video conference.

17. The apparatus of claim 15 wherein identifying said active locations comprises identifying locations of active speakers in the video.

18. The apparatus of claim 15 wherein the activity data comprises speaker tracking data.

19. The apparatus of claim 15 wherein transmitting the edited video comprises transmitting the edited video to an endpoint in the video conference with a delay in a live broadcast.

20. Logic encoded on one or more non-transitory computer readable media for execution and when executed operable to:
    automatically process video based on activity data, wherein processing comprises identifying active locations in the video and editing the video to display each of said active locations before a start of activity at said location and switch between said active locations before a start of activity; and
    transmit the edited video from the network device as a near real-time video with a small delay to account for automated editing of the video;
    wherein the video and activity data are collected for a video conference and the video comprises raw video from one or more endpoints and contains said active locations and wherein the edited video displays said active locations before a start of said activity at said active locations and includes a speaker's initial facial reaction before speaking.

* * * * *